US009613173B1

(12) United States Patent
Aggarwal et al.

(10) Patent No.: US 9,613,173 B1
(45) Date of Patent: Apr. 4, 2017

(54) INTERACTIVE MULTI-STEP PHYSICAL SYNTHESIS

(71) Applicant: Xilinx, Inc., San Jose, CA (US)

(72) Inventors: Rajat Aggarwal, Los Altos, CA (US);
Zhiyong Wang, Cupertino, CA (US);
Ruibing Lu, Santa Clara, CA (US);
Sabyasachi Das, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/873,072

(22) Filed: Oct. 1, 2015

(51) Int. Cl.
*G06F 17/50* (2006.01)
(52) U.S. Cl.
CPC ...... *G06F 17/5054* (2013.01); *G06F 17/5077* (2013.01); *G06F 17/5081* (2013.01)
(58) Field of Classification Search
CPC .................... G06F 17/5027; G06F 17/5045
USPC .................................................. 716/101, 103
See application file for complete search history.

(56) References Cited

U.S. PATENT DOCUMENTS

| 6,651,225 B1 * | 11/2003 | Lin et al. ............ G06F 17/5027 716/113 |
| 6,754,763 B2 * | 6/2004 | Lin ..................... G06F 15/7864 361/748 |
| 6,785,873 B1 * | 8/2004 | Tseng .................. G06F 17/5022 716/102 |
| 8,196,081 B1 | 6/2012 | Arslan et al. |
| 8,196,083 B1 | 6/2012 | Kong |
| 8,201,130 B1 | 6/2012 | Kalman et al. |
| 8,250,513 B1 | 8/2012 | Verma et al. |

OTHER PUBLICATIONS

Altera, "Hyper-Pipelining for Stratix 10 Designs," AN715, Jun. 8, 2015, pp. 1-29, Altera Corporation, San Jose, California, USA.
Altera, "Netlist Optimizations and Physical Synthesis," Quartus II Handbook Version 13.1, QII52007-13.1.0, Nov. 2013, pp. 16-1 to 16-16, Altera Corporation, San Jose, California, USA.
Altera, "Timing Closure and Optimization," Quartus II Handbook Version 13.1, QII52005-13.1.0, Nov. 2013, pp. 12-1 to 12-46, Altera Corporation, San Jose, California, USA.
Synopsys, "Synplify Premier," copyright 2011, pp. 1-4, Synopsys, Inc., Mountain View, California, USA.

* cited by examiner

*Primary Examiner* — Sun Lin
(74) *Attorney, Agent, or Firm* — LeRoy D. Maunu (57) ABSTRACT

A processor-implemented method is provided for placing and routing a circuit design. A first netlist is generated for the circuit design. Placement is performed for the first netlist on a target programmable integrated circuit (IC) to produce a first placed design. A set of optimizations are performed on the first placed design. The set of optimizations are recorded in an optimization history file. One or more optimizations specified in the optimization history file are performed on the first netlist to produce a second netlist that is different than the first netlist. Placement is performed for the second netlist on the target programmable IC to produce a second placed design that is different than the first placed design. Nets of the second placed design are routed to produce a placed and routed circuit design.

20 Claims, 5 Drawing Sheets

INTERACTIVE MULTI-STEP PHYSICAL SYNTHESIS

TECHNICAL FIELD

The disclosure generally relates to placement, routing, and timing closure of resources in programmable integrated circuits.

BACKGROUND

Programmable logic devices (PLDs) are integrated circuits (ICs) that are used to implement digital logic operations according to user configurable input. Example PLDs include Complex Programmable Logic Devices (CPLDs) and field programmable gate arrays (FPGAs). CPLDs often include several function blocks that are based on programmable logic array (PLA) architecture with sum-of-products logic. A configurable interconnect matrix transmits signals between the function blocks.

An example FPGA includes an array of configurable logic blocks (CLBs) and a ring or columns of programmable input/output blocks (IOBs). The CLBs and IOBs are interconnected by a programmable interconnect structure (routing resources). The CLBs, IOBs, and interconnect structure are typically programmed by loading a stream of configuration data (bitstream) into internal configuration memory cells that define how the CLBs, IOBs, and interconnect structure are configured. The configuration bitstream may be read from an external memory, conventionally an external integrated circuit memory EEPROM, EPROM, PROM, and the like, though other types of memory may be used. The collective states of the individual memory cells determine the function of the FPGA. A specific type of FPGA uses a look-up-table (LUT)-based CLB. The configuration memory provides input values to a number of multiplexers controlled by inputs to the CLB.

A conventional design process for an integrated circuit, such as an ASIC or an FPGA begins with the creation of the circuit design. The function of a circuit design may be represented using various programmable languages (e.g., VHDL, ABEL or Verilog) or schematic capture programs. The design is logically synthesized to produce a logical network list ("netlist") supported by the target integrated circuit device. The netlist is mapped to primitive components that are available within a target device (e.g., a target programmable IC).

Following logical synthesis, components of the netlist are placed for implementation within the target device. During placement, each mapped component of the design is assigned to a physical position on the chip where an instance of the corresponding primitive component may be found. The purpose of the placer is to place connected design objects in close physical proximity to one another. This conserves space on the chip and increases the probability that the desired interconnections between components will be successfully completed by the router. Placing connected components close to one another also generally improves the performance of the circuit, since long interconnect paths are associated with excess capacitance and resistance, resulting in longer delays.

Specified connections between components of the design are routed within the target device for the placed components. Routing specifies physical wiring resources that will be used to conduct signals between pins of placed components of the design. For each connection specified in the design, routing must allocate wiring necessary to complete the connection. As used herein, the selection and assignment of wire resources in connecting the output pin of one component to the input pin of another component is referred to as routing a signal. When signals have been routed using most or all of the wiring resources in a given area, the area is generally referred to as congested, which creates competition for the remaining wiring resources in the area or makes routing of additional signals in the area difficult or impossible. Place-and-route procedures sometimes involve optimization of a design's timing, power consumption, routing resources utilized, and any combination thereof. In some instances, timing-based estimations of the design are also provided.

SUMMARY

Various example implementations are directed to efficient methods for logical synthesis, placement, optimization, and routing of a circuit design. In one embodiment of the invention, a first netlist is generated for a circuit design. A placement of the first netlist is determined for implementation on a target programmable IC to produce a first placed design. A set of optimizations are performed on the first placed design. For each of the set of optimizations, the optimization is recorded in an optimization history file. One or more optimizations specified in the optimization history file are performed on the first netlist to produce a second netlist that is different than the first netlist. Placement of the second netlist is determined for implementation on the target programmable IC to produce a second placed design that is different than the first placed design. Nets of the second placed design are routed to produce a placed and routed circuit design.

Systems are also disclosed for logical synthesis, placement, optimization, and routing of a circuit design. In an example implementation, a system includes a processor and a memory arrangement coupled to the processor. The memory arrangement is configured with instructions that when executed by the processor cause the processor to generate a first netlist for a circuit design stored in the memory and determine a placement of the first netlist for implementation on a target programmable IC to produce a first placed design. The instructions further cause the processor to perform a set of optimizations on the first placed design. The processor also records each of the optimizations in an optimization history file. The instructions further cause the processor to determine a placement of the second netlist for implementation on the target programmable IC to produce a second placed design. The second placed design is different than the first placed design. Nets of the second placed design are routed to produce a placed and routed circuit design It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

In routing a circuit design, a large number of different routes may be tested before a routing solution is found that satisfies timing requirements of a design. Routing time may be lengthened due to non-optimal placement. In current placement and routing techniques, physical synthesis optimizations are performed after placement and are followed by routing of the optimized design. Physical synthesis optimization may be performed, for example, to improve timing, noise margins, die area, and/or power usage. Physical synthesis optimizations transform physical elements of a circuit design into different, yet logically identical, physical elements that meet the design requirements.

Due to changes made to the circuit design during the physical synthesis optimizations, the placement may no longer be optimal for the modified circuit design. Because physical synthesis optimizations are performed after placement, the placement does not take changes resulting from the optimization into account. As a result, routing software may waste a large amount of computing resources (e.g., processing time and/or processor circuits) routing and rerouting signals in an attempt to satisfy timing requirements via routing of signals without modifying placement of circuit modules.

Additionally, due to congestion, it may not be possible to determine a valid routing solution if some optimizations are performed. For instance, some processes may implement an optimization and evaluate the change to estimate if a routing solution is possible. If a routing solution is estimated to be impossible, the change is undone. Otherwise, the change is committed and the process may continue with additional optimizations. Due to the inability to perform some optimizations, efficiency/performance (e.g., die area, power consumption, or operating frequency) of a placed and routed circuit design may be limited.

Methods and systems are disclosed that overcome the above-mentioned limitations by performing physical synthesis optimizations prior to placement. In an example implementation, a first netlist is generated for a circuit design. An initial temporary placement is determined for a first netlist of the circuit design. Using the initial placement, physical synthesis optimizations are performed to the placed netlist and are recorded in an optimization history file. Since the initial placement is only temporary, optimizations do not need to be evaluated to estimate feasibility of routing. Rather than attempting to route signals for the initial placement, the recorded physical synthesis optimizations are then performed on the first unplaced netlist to produce a second netlist. The second netlist is then placed to provide an improved placement that takes the optimizations into account. For ease of reference, placement performed after optimization may be referred to as optimization-aware placement. After optimization-aware placement, nets of the design are routed to produce a placed and routed circuit design.

As a result of the improved placement, a signal routing that satisfies timing requirements may be determined in fewer routing attempts, in comparison to previous approaches that implement optimization changes after placement. Accordingly, a routing solution can be determined using fewer computing resources (e.g., processing time, memory, and/or number of processor circuits).

Performing optimizations prior to placement also allows optimizations to be performed that would not be possible using conventional post-placement optimization. For instance, as previously described, previous approaches may undo optimization changes if evaluation estimates a routing solution may not be possible. However, when placement is performed after optimization, elements can be placed to facilitate routing with the optimization changes in place. In this manner, the number of possible optimizations that may be performed is increased. As a result, various performance metrics (e.g., die area, power consumption, and/or operating frequency) can be improved in comparison to post-placement optimization approaches. The type of improvement that is achieved in the implemented design will depend on the type of optimizations that are performed. For example, if the optimization techniques focus on power-related enhancements, a placed and routed design can be achieved that consumes less power. In contrast, if the optimization techniques focus on timing and operating frequency, a placed and routed design can be achieved that operates at a higher clock frequency.

Figure 1:
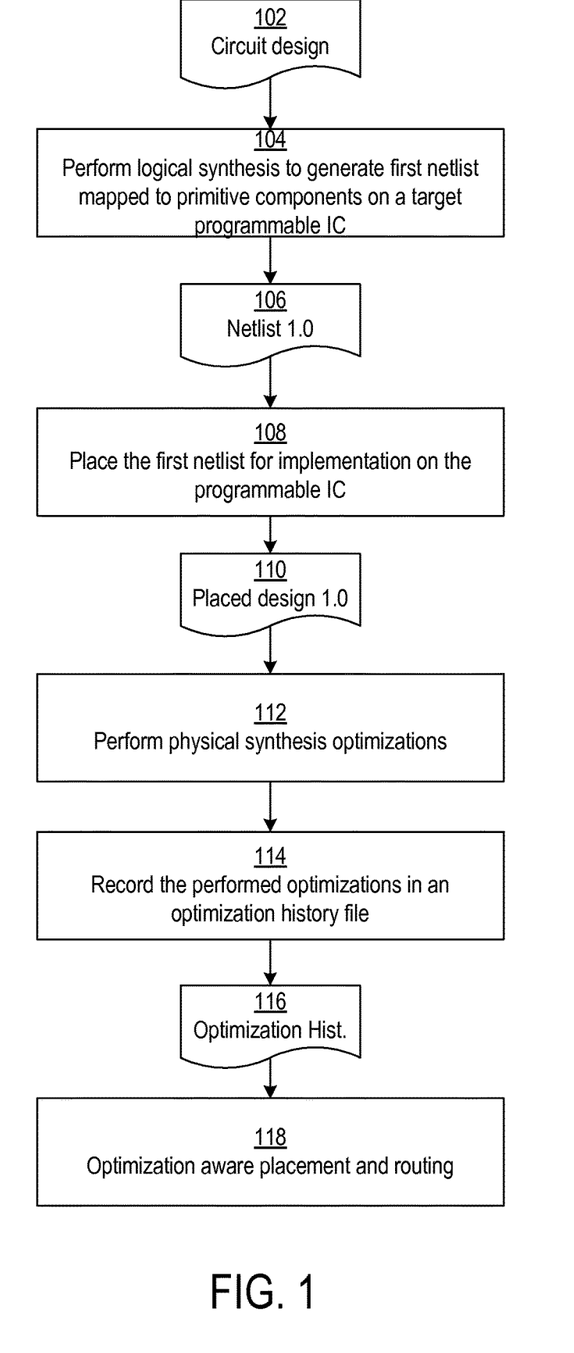
FIG. 1 shows a flowchart of an example process for initial placement and physical synthesis optimization of a circuit design, consistent with one or more implementations.

Turning now to the figures, FIG. 1 shows a flowchart of an example process for initial placement and physical synthesis optimization of a circuit design. At block 104 logical synthesis is performed to generate a first netlist 106 (Netlist 1.0) for a circuit design 102. Netlist 106 maps elements of the circuit design to primitive components available on a target programmable IC. At block 108, the first netlist 106 is placed for implementation on the programmable IC to produce a first placed design 110. At block 112, physical synthesis optimizations are performed on the first placed design.

Physical synthesis optimizations may include various optimization techniques including, for example, fan-out optimization, critical cell optimization, forced net replication, replacement optimization, DSP register optimization, BRAM register optimization, shift register optimization, rewire/look-up table optimization, retiming optimization, critical pin optimization, and/or hold-time fixing optimization. Fanout optimization replicates drivers for large fanout nets that drive a large number of loads. In some implementations, optimization of a fanout net may cluster loads driven by the net based on proximity. A net driver circuit is replicated and inserted to drive each load cluster. A similar optimization, known as critical cell optimization, adds driver circuits closer to a load(s) in a signal path that does not satisfy timing requirements. For instance, if the loads on a specific cell are placed far apart, the cell may be replicated with new drivers placed closer to load clusters. High fanout is not a requirement for this optimization to occur. Forced net replication forces the net drivers in timing-constrained path to be replicated, regardless of timing slack.

Register optimization can move registers to improve timing of critical paths. For example, DSP register optimization can move registers between a DSP cell and another physical element on the target programmable IC (e.g., another DSP cell) if movement would improve the delay on the critical path. For instance, a first DSP may include a register having an output coupled to an input of a second DSP. If timing of a path between the register and the second DSP is critical, the register may be moved closer to the second DSP or even inside the second DSP (if an unused register is available). A similar optimization, known as BRAM register optimization, can move registers between a BRAM cell and other elements on the target programmable IC. Shift register optimization relocates a register from the beginning or end of a shift register to another location (e.g., closer to a source connected to the input of the shift register or a load connected to the output of the shift register.

Another optimization, referred to as retiming, improves the delay on the critical path by moving registers across combinational logic. Replacement optimization may replace a critical cell with a logically equivalent cell configured to optimize a particular parameter. For instance, a default Fast-Fourier-Transform (FFT) in a circuit design may be replaced with an FFT optimized, for example, for higher processing speed, smaller footprint, or reduced power consumption. Rewire optimization swaps connections on LUTs to reduce the number of logic levels for critical signals. LUT equations are modified to maintain design functionality. Hold-Fixing optimization attempts to improve slack of high hold violations by increasing delay on the hold critical paths.

At block 114, the physical synthesis optimizations are recorded in an optimization history file 116. In some implementations the optimizations may be specified in the optimization history file as tool command language (TCL) script that performs the optimization when executed. As previously described, due to changes performed as a result of physical synthesis optimization, the first placement may not be optimal. At block 118, the optimization history file 116 is used to perform optimization-aware placement and routing. In some implementations, data acquired by timing analysis (e.g., shortest path timing for each signal) may be also stored in the optimization history file. The data may be used to identify module instances, for which timing was critical with the first placement. When optimization-aware placement is performed, at block 118, the identified module instances may be placed to shorten routing distance for the timing critical paths.

Figure 2:
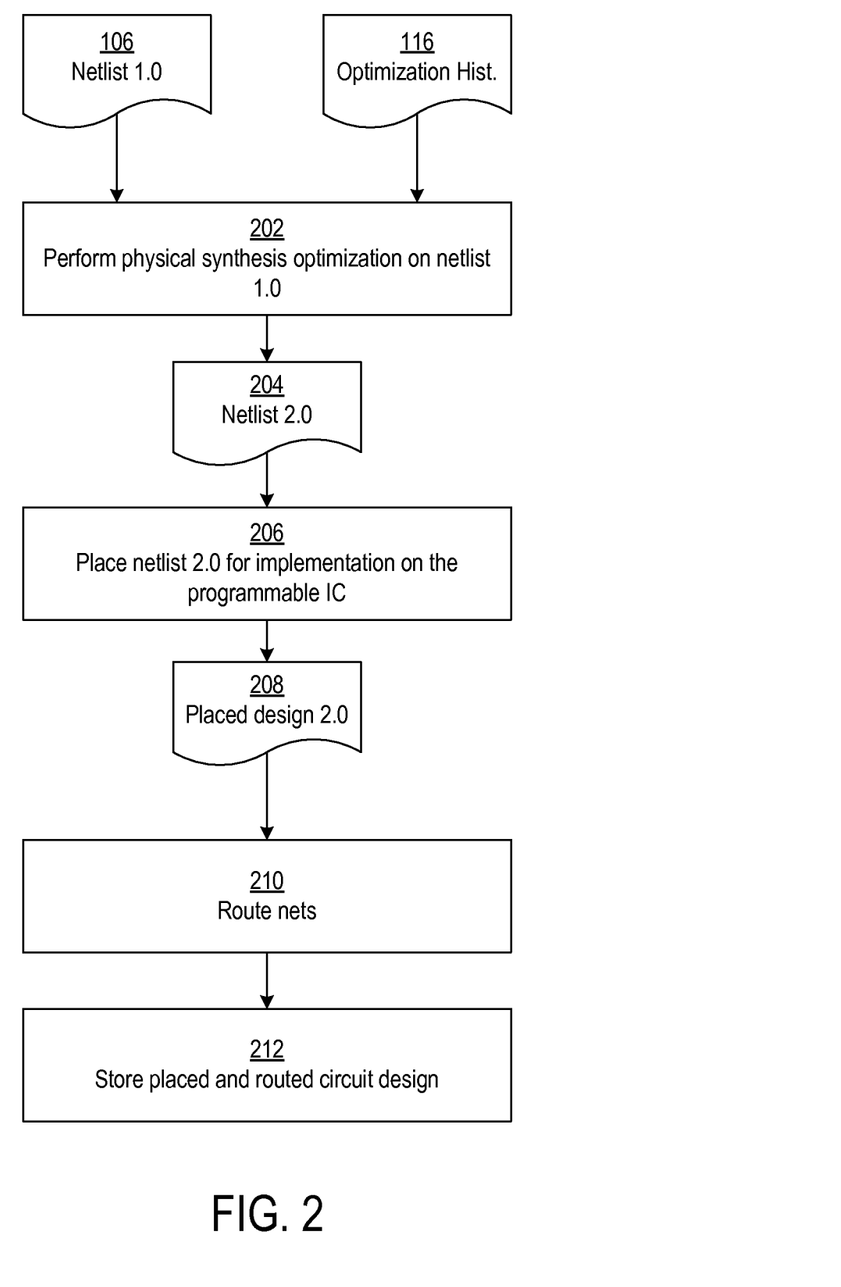
FIG. 2 shows a flowchart of an example process for optimization-aware placement and routing of a circuit design, consistent with one or more implementations.

FIG. 2 shows a flowchart of an example process for optimization-aware placement and routing of a circuit design, consistent with one or more implementations. At block 202, physical synthesis optimizations indicated on the optimization history file 116 are performed on the first non-placed netlist 106 to produce a second netlist 204.

At block 206, the second netlist 204 is placed for implementation on the target programmable IC to produce a second placed design 208. Because optimization is performed prior to the placement at block 208, the placement is able to take optimization changes into account and provide an improved placement (e.g., for space, timing, or operating speed) in comparison to the first placed design 110. In some implementations, placement performed at block 208 may utilize performance estimates determined during the physical optimization process. For instance, physical synthesis processes may identify timing critical circuit as targets for optimization. Timing critical circuits are circuits that have low or negative timing slack. The placement performed at block 208 place timing critical circuits first so timing critical circuits can be placed closer together without competing with non-critical circuits for programmable resources.

At block 210, nets of the circuit design are routed between elements of the placed design. Signals may be routed using a number of different routing algorithms that attempt to optimize the routing for different characteristics. In one routing algorithm, signals are routed to minimize timing delay characteristics of each signal. This is referred to as a delay-mode routing. In another routing algorithm, signals are routed to minimize the number of routing resources used. This is referred to as resource-mode routing. In general, delay-mode optimization requires a longer runtime than resource-mode optimization. In delay-mode optimization, different possible paths are analyzed or simulated to determine a propagation delay parameter. The routing algorithm searches for a solution that has a timing delay less than or equal to the original timing delay. However, once a solution is found the routing algorithm does not waste processing trying to further optimize the timing of the signal. In some implementations, critical signals may be routed using delay-mode routing and non-critical signals may be routed using resource-mode routing. At block 212, the placed and routed circuit design is stored.

A circuit design may be modified several times throughout the development process. Due to the large amount of time required to perform for placement and routing of an entire design, it is desirable to avoid repeating the entire process of physical synthesis optimization, placement, and routing when only a small portion of the design has changed. In some implementations, an optimization history file recorded in placement and routing of an earlier circuit design may be reused to guide pre-placement optimizations for a later version of the circuit design—thereby allowing the process to skip the initial placement and optimization performed in FIG. 1.

In some implementations, each optimization in the optimization history file may specify the type of optimization and a name of a module instance(s) modified by the optimization. In some scenarios, the optimization process performed at block 202 may identify modules in the second netlist 204 that are to be modified based on the module instance names indicated in the optimization history file. However, in some instances, module instance names in the second netlist 204 may differ from module instance names indicated in the module history file. For example, when an optimization history file is reused to guide pre-placement optimization of a netlist for a later version of the circuit design, names of module instances in the netlist may not match those in the optimization history file. For instance, if a module is updated by a designer, design software may slightly change the names of the module instances. If module instances for a recorded optimization cannot be identified based on names, a more complex signature-based approach can be used, for example based on the name of the instance, type of the instance (LUT5, FDRE, D5P48E2 etc.), and names of connected nets.

Figure 3:
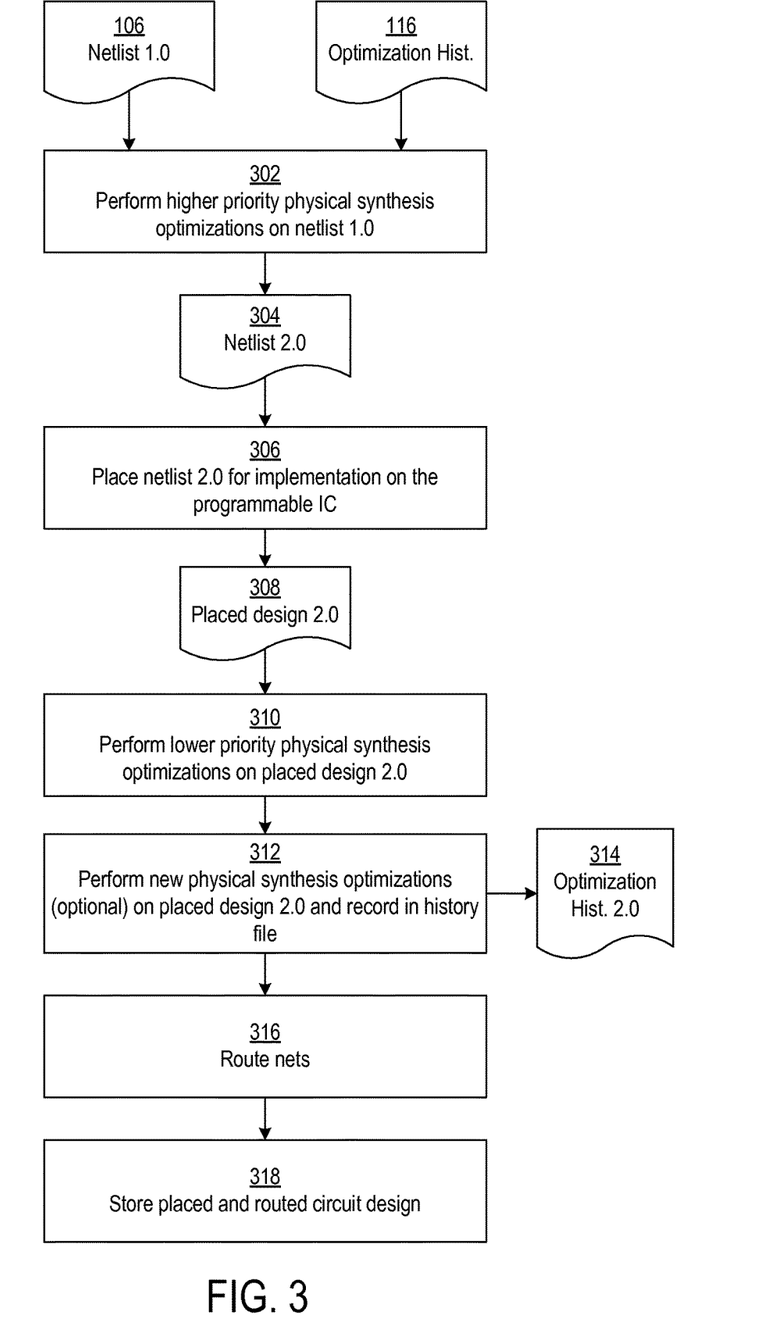
FIG. 3 shows a flowchart of another example process for optimization-aware placement and routing of a circuit design, consistent with one or more implementations.

In some implementations, the process may perform only a subset of the optimizations in the optimization history file prior to repeating placement. FIG. 3 shows a flowchart of another example process for optimization-aware placement and routing of a circuit design, consistent with one or more implementations. In this example, performance of physical synthesis optimizations is split between pre-placement and post-placement stages. Splitting physical synthesis optimization into pre-placement and post-placement stages, placement of the netlist can be performed to prioritize a particular metric of primary importance (e.g., timing/clock speed, die space, or power consumption). For example, if processing speed is of primary importance, timing optimization may be indicated as higher priority in the optimization history file. Other non-timing optimizations may be indicated as a lower priority in the optimization history file.

At block 302, a set of higher priority physical synthesis optimizations indicated in the optimization history file 116 are performed on the first netlist 106 to produce a second netlist 304. At block 306, the second netlist 304 is placed for implementation on the target programmable IC to produce a second placed design 308. Following placement, a set of lower priority physical synthesis optimizations indicated in the optimization history file are performed at block 310. In some implementations, new physical optimizations, which are not indicated in the optimization history file 116, may be performed at block 312. Any new optimizations performed are added to the optimization history file to produce an updated optimization history file 314. At block 316, signal nets are routed for the second placed design. At block 318, the placed and routed circuit design is stored.

Figure 4:
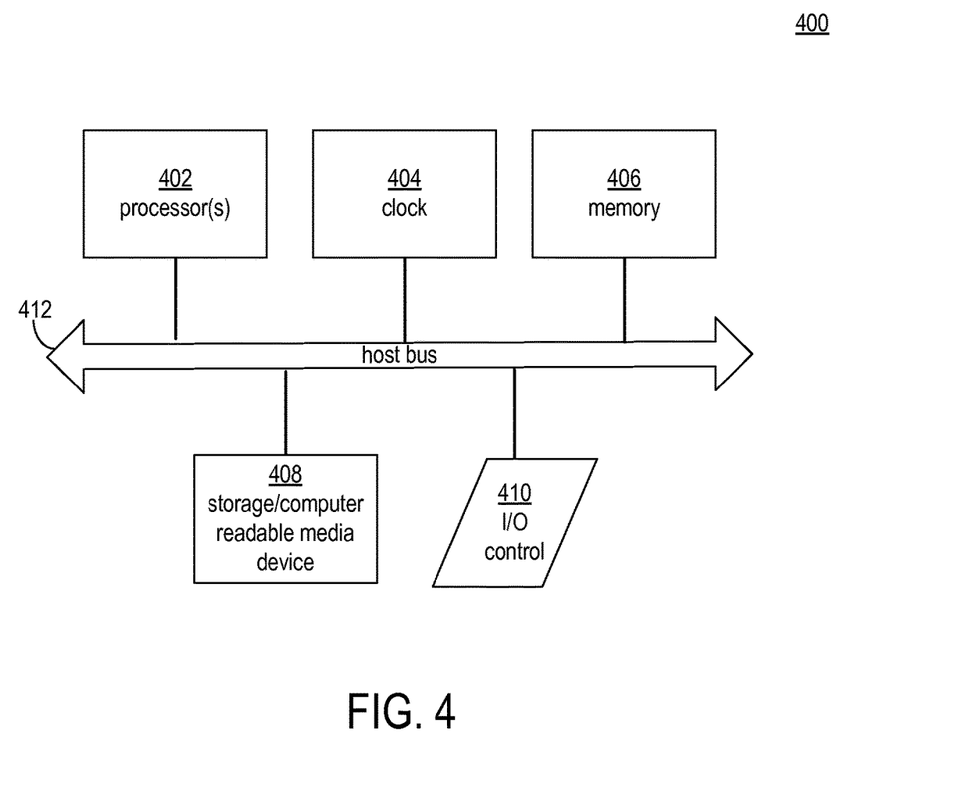
FIG. 4 shows a block diagram of a computing arrangement that may be configured to perform logical synthesis, physical synthesis optimization, placement, and routing in accordance with several embodiments of the invention.

FIG. 4 shows a block diagram of a computing arrangement that may be configured to perform the disclosed logical synthesis, physical synthesis optimization, placement, and routing processes described herein. Those skilled in the art will appreciate that various alternative computing arrangements, including one or more processors and a memory arrangement configured with program code, would be suitable for hosting the processes and data structures and implementing the algorithms of the different embodiments of the present invention. The computer code, comprising the processes of the present invention encoded in a processor executable format, may be stored and provided via a variety of non-transitory computer-readable storage media or delivery channels such as magnetic or optical disks or tapes, electronic storage devices, or as application services over a network.

Processor computing arrangement 400 includes one or more processors 402, a clock signal generator 404, a memory unit 406, a storage unit 408, and an input/output control unit 410 coupled to host bus 412. The arrangement 400 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 402 may be one or more general purpose processors, or a combination of one or more general purpose processors and suitable co-processors, or one or more specialized processors (e.g., RISC, CISC, pipelined, etc.).

The memory arrangement 406 typically includes multiple levels of cache memory and a main memory. The storage arrangement 408 may include local and/or remote persistent storage such as provided by magnetic disks (not shown), flash, EPROM, or other non-volatile data storage. The storage unit may be read or read/write capable. Further, the memory 406 and storage 408 may be combined in a single arrangement.

The processor arrangement 402 executes the software in storage 408 and/or memory 406 arrangements, reads data from and stores data to the storage 408 and/or memory 406 arrangements, and communicates with external devices through the input/output control arrangement 410. These functions are synchronized by the clock signal generator 404. The resource of the computing arrangement may be managed by either an operating system (not shown), or a hardware control unit (not shown). Those skilled in the art will appreciate that various alternative computing arrangements, including one or more processors and a memory arrangement configured with program code, would be suitable for hosting the processes and data structures of the different embodiments of the present invention.

Figure 5:
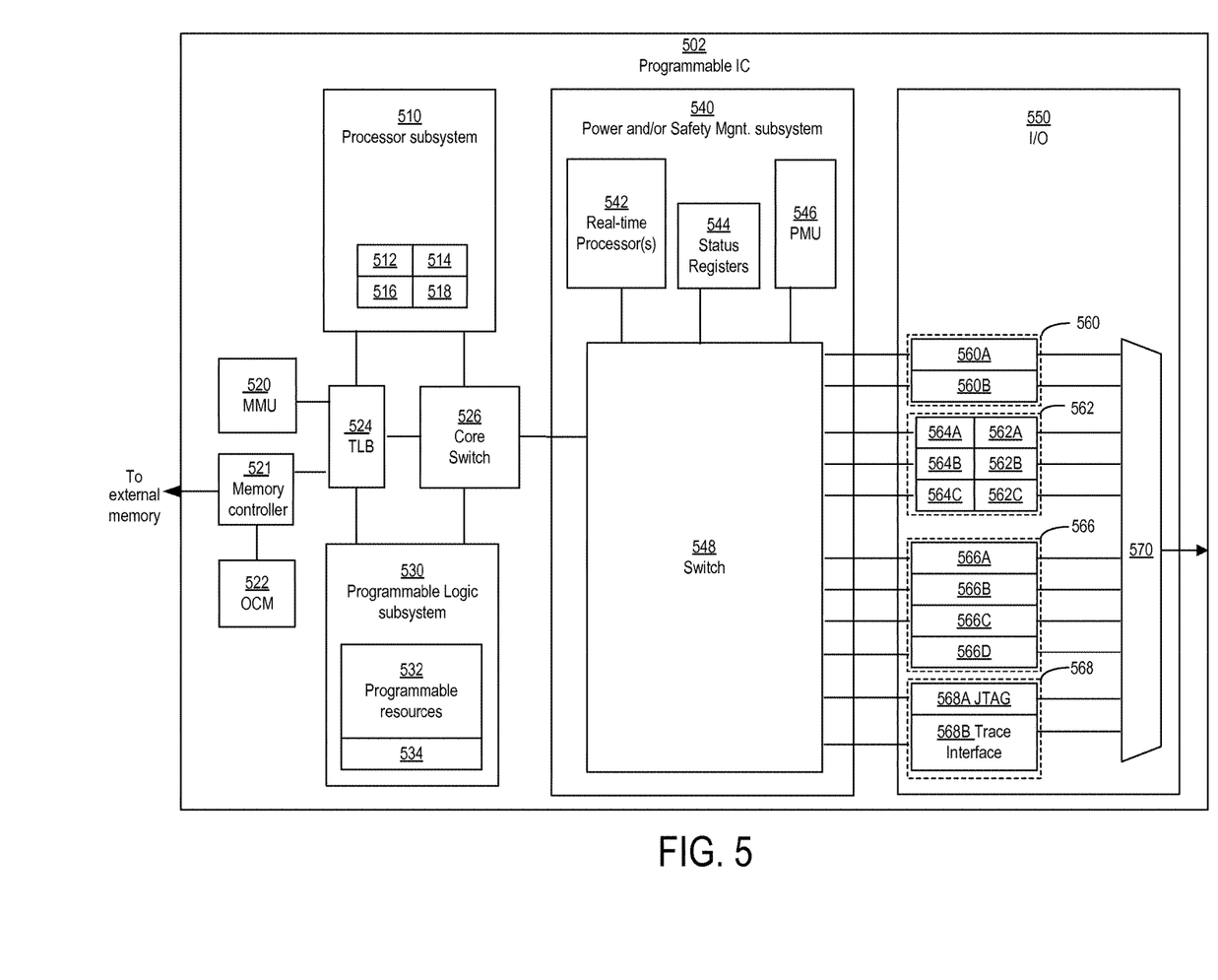
FIG. 5 shows a block diagram of a programmable integrated circuit, which may be used as a target device for placement and routing in accordance with various embodiments of the invention.

FIG. 5 shows a block diagram of a programmable integrated circuit, which may be used as a target device for placement and routing, in accordance with various embodiments of the invention. The programmable IC may also be referred to as a System On Chip (SOC), which includes a processor subsystem 510 and a programmable logic subsystem 530. The processor subsystem 510 may be programmed to implement a software portion of the user design, via execution of a user program. The program may be specified as part of a configuration data stream or may be retrieved from an on-chip or off-chip data storage device. The processor subsystem 510 may include various circuits 512, 514, 516, and 518 for executing one or more software programs. The circuits 512, 514, 516, and 518 may include, for example, one or more processor cores, floating point units (FPUs), an interrupt processing unit, on chip-memory, memory caches, and/or cache coherent interconnect.

The programmable logic subsystem 530 of the programmable IC 502 may be programmed to implement a hardware portion of a user design. For instance, the programmable logic subsystem may include a number of programmable resources 532, which may be programmed to implement a set of circuits specified in a configuration data stream. The programmable resources 532 include programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 532 may be programmed by loading a configuration data stream into the configuration memory cells, which define how the programmable interconnect circuits and programmable logic circuits are configured. The collective states of the individual memory cells then determine the function of the programmable resources 532. The configuration data can be read from memory (e.g., from an external PROM) or written into the programmable IC 502 by an external device. In some implementations, configuration data may be loaded into configuration memory cells by a configuration controller 534 included in the programmable logic subsystem 530. In some other implementations, the configuration data may be loaded into the configuration memory cells by a start-up process executed by the processor subsystem 510.

The programmable IC 502 may include various circuits to interconnect the processor subsystem 510 with circuitry implemented within the programmable logic subsystem 530. In this example, the programmable IC 502 includes a core switch 526 that can route data signals between various data ports of the processor subsystem 510 and the programmable logic subsystem 530. The core switch 526 may also route data signals between either of the programmable logic or processing subsystems 510 and 530 and various other circuits of the programmable IC, such as an internal data bus. Alternatively or additionally, the processor subsystem 510 may include an interface to directly connect with the programmable logic subsystem—bypassing the core switch 526. Such an interface may be implemented, for example, using the AMBA AXI Protocol Specification (AXI) as published by ARM.

In some implementations, the processor subsystem 510 and the programmable logic subsystem 530 may also read or write to memory locations of an on-chip memory 522 or off-chip memory (not shown) via memory controller 521. The memory controller 521 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 521 is able to communicate is provided for purposes of illustration only and is not intended as a limitation or to be exhaustive. As shown in FIG. 5, the programmable IC 502 may include a memory management unit 520 and translation look-aside buffer 524 to translate virtual memory addresses used by the subsystems 510 and 530 to physical memory addresses used by the memory controller 521 to access specific memory locations.

The programmable IC may include an input/output (I/O) subsystem 550 for communication of data with external circuits. The I/O subsystem 550 may include various types of I/O devices or interfaces including for example, flash memory type I/O devices, higher performance I/O devices, lower performance interfaces, debugging I/O devices, and/or RAM I/O devices.

The I/O subsystem 550 may include one or more flash memory interfaces 560 illustrated as 560A and 560B. For example, one or more of flash memory interfaces 560 can be implemented as a Quad-Serial Peripheral Interface (QSPI) configured for 4-bit communication. One or more of flash memory interfaces 560 can be implemented as a parallel 8-bit NOR/SRAM type of interface. One or more of flash memory interfaces 560 can be implemented as a NAND interface configured for 8-bit and/or 16-bit communication. It should be appreciated that the particular interfaces described are provided for purposes of illustration and not limitation. Other interfaces having different bit widths can be used.

The I/O subsystem 550 can include one or more interfaces 562 providing a higher level of performance than flash memory interfaces 560. Each of interfaces 562A-562C can be coupled to a DMA controller 564A-564C respectively. For example, one or more of interfaces 562 can be implemented as a Universal Serial Bus (USB) type of interface. One or more of interfaces 562 can be implemented as a gigabit Ethernet type of interface. One or more of interfaces 562 can be implemented as a Secure Digital (SD) type of interface.

The I/O subsystem 550 may also include one or more interfaces 566 such as interfaces 566A-566D that provide a lower level of performance than interfaces 562. For example, one or more of interfaces 566 can be implemented as a General Purpose I/O (GPIO) type of interface. One or more of interfaces 566 can be implemented as a Universal Asynchronous Receiver/Transmitter (UART) type of interface. One or more of interfaces 566 can be implemented in the form of a Serial Peripheral Interface (SPI) bus type of interface. One or more of interfaces 566 can be implemented in the form of a Controller-Area-Network (CAN) type of interface and/or an $I^2C$ type of interface. One or more of interfaces 566 also can be implemented in the form of a timer type of interface.

The I/O subsystem 550 can include one or more debug interfaces 568 such as processor JTAG (PJTAG) interface 568A and a trace interface 568B. PJTAG interface 568A can provide an external debug interface for the programmable IC 502. Trace interface 568B can provide a port to receive debug, e.g., trace, information from the processor subsystem 510 or the programmable logic subsystem 530.

As shown, each of interfaces 560, 562, 566, and 568 can be coupled to a multiplexer 570. Multiplexer 570 provides a plurality of outputs that can be directly routed or coupled to external pins of the programmable IC 502, e.g., balls of the package within which the programmable IC 502 is disposed. For example, I/O pins of programmable IC 502 can be shared among interfaces 560, 562, 566, and 568. A user can configure multiplexer 570, via a configuration data stream to select which of interfaces 560-568 are to be used and, therefore, coupled to I/O pins of programmable IC 502 via multiplexer 570. The I/O subsystem 550, may also include a fabric multiplexer I/O (FMIO) interface (not shown) to connect interfaces 562-568 to programmable logic circuits of the programmable logic subsystem. Additionally or alternatively, the programmable logic subsystem 530 can be configured to implement one or more I/O circuits within programmable logic. In some implementations, the programmable IC 502 may also include a subsystem 540 having various circuits for power and/or safety management. For example, the subsystem 540 may include a power management unit 546 configured to monitor and maintain one or more voltage domains used to power the various subsystems of the programmable IC 502. In some implementations, the power management unit 546 may disable power of individual subsystems, when idle, to reduce power consumption, without disabling power to subsystems in use.

The subsystem 540 may also include safety circuits to monitor the status of the subsystems to ensure correct operation. For instance, the subsystem 540 may include one or more real-time processors 542 configured to monitor the status of the various subsystems (e.g., as indicated in status registers 544). The real-time processors 542 may be configured to perform a number of tasks in response to detecting errors. For example, for some errors, the real-time processors 542 may generate an alert in response to detecting an error. As another example, the real-time processors 542 may reset a subsystem to attempt to restore the subsystem to correct operation. The subsystem 540 includes a switch network 548 that may be used to interconnect various subsystems. For example, the switch network 548 may be configured to connect the various subsystems 510, 530, and 540 to various interfaces of the I/O subsystem 550. In some applications, the switch network 548 may also be used to isolate the real-time processors 542 from the subsystems that are to be monitored. Such isolation may be required by certain application standards (e.g., IEC-61508 SIL3 or ISO-26262 standards) to ensure that the real-time processors 542 are not affected by errors that occur in other subsystems.

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

The present invention is thought to be applicable to a variety of systems for the placement and routing of circuit designs. Further, while FPGAs and other PLDs are described as suitable target programmable ICs to which the systems and methods of the invention can be applied, the invention is not limited thereto. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims and equivalents thereof.

What is claimed is:

1. A method, comprising:
executing on a processor operations including:
generating a first netlist for a circuit design stored in a memory coupled to the processor;
determining a placement of the first netlist on a target integrated circuit (IC) to produce a first placed design;
performing a set of optimizations on the first placed design;
recording the set of optimizations in an optimization history file;
performing one or more optimizations specified in the optimization history file on the first netlist to produce a second netlist that is different than the first netlist;
determining placement of the second netlist on the target IC to produce a second placed design that is different than the first placed design; and
routing nets of the second placed design to produce a placed and routed circuit design.

2. The method of claim 1, wherein the performing one or more optimizations prior to the determining placement of the second netlist reduces processing resources required to perform the placement of the second netlist and routing of the nets in the second placed design relative to processing resources required to perform the placement of the first netlist and routing of nets in the first placed design.

3. The method of claim 1, wherein the performing one or more optimizations specified in the optimization history file on the first netlist includes:
determining a set of higher priority optimizations on the first netlist in the optimization history file and a set of lower priority optimizations in the optimization history file; and
performing only optimizations included in the set of higher priority optimizations.

4. The method of claim 3, further comprising following the placement of the second netlist, performing the set of lower priority optimizations on the second placed netlist.

5. The method of claim 1, wherein
the optimization history file further identifies one or more timing critical circuit modules, and
the determining placement of the second netlist on the target IC places the one or more timing critical circuit modules prior to placing other circuit modules of the second netlist.

6. The method of claim 1, further comprising:
identifying a module instance in the second netlist for an optimization recorded in the optimization history file; and
performing the optimization on the identified module instance.

7. The method of claim 1, wherein the one or more optimizations specified in the optimization history file includes digital signal processor (DSP) register optimization, block random access memory (BRAM) register optimization, shift-register optimization, or combinations thereof.

8. The method of claim 1, wherein:
the one or more optimizations specified in the optimization history file includes decomposing of a circuit module of the circuit design into a plurality of submodules; and
the determining placement of the second netlist determines a placement of each of the plurality of submodules independently.

9. The method of claim 1, wherein the one or more optimizations specified in the optimization history file includes/include forced net replication, fan-out optimization, replacement optimization, or a combination thereof.

10. The method of claim 1, wherein the one or more optimizations specified in the optimization history file includes/include rewire/look-up table optimization, retiming optimization, critical pin optimization, and/or hold-time fixing optimization, or a combination thereof.

11. The method of claim 1, further comprising:
generating a set of configuration data configured to program programmable resources of the target IC to implement the placed and routed circuit design; and
storing the set of configuration data in a non-volatile memory coupled to the target IC, wherein the target IC is configured to program, when powered on, the programmable resources of the target IC with the set of configuration data in the non-volatile memory.

12. The method of claim 1, wherein the optimization history file specifies the set of optimizations in a tool command language script.

13. A system, comprising:
a processor; and
a memory arrangement coupled to the processor, wherein the memory arrangement is configured with instructions that, when executed by the processor, cause the processor to perform operations including:
generating a first netlist for a circuit design stored in the memory arrangement;
determining a placement of the first netlist on a target integrated circuit (IC) to produce a first placed design;
performing a set of optimizations on the first placed design;
recording the set of optimizations in an optimization history file;
performing optimizations specified in the optimization history file on the first netlist to produce a second netlist that is different than the first netlist;
determining placement of the second netlist on the target IC to produce a second placed design that is different than the first placed design; and
routing nets of the second placed design to produce a placed and routed circuit design.

14. The system of claim 13, wherein the performing one or more optimizations prior to the determining placement of the second netlist reduces processing resources required to perform the placement of the second netlist and routing of the nets in the second placed design in comparison to processing resources required to perform the placement of the first netlist and routing of nets in the first placed design.

15. The system of claim 14, wherein:
in the performing one or more optimizations specified in the optimization history file on the first netlist, the processor:
determines a set of higher priority optimizations in the optimization history file and a set of lower priority optimizations in the optimization history file; and
performs only optimizations included in the set of higher priority optimizations on the first netlist; and
the instructions further cause the processor to perform the set of lower priority optimizations on the second placed netlist following the placement of the second netlist.

16. The system of claim 13, wherein
the optimization history file further identifies one or more timing critical circuit modules, and
in determining the placement of the second netlist on the target IC, the processor places the one or more timing critical circuit modules prior to placing other circuit modules of the second netlist.

17. The system of claim 13, wherein the instructions further cause the processor to:
identify a module instance in the second netlist for an optimization recorded in the optimization history file; and
perform the optimization on the identified module instance.

18. The system of claim 13, wherein the one or more optimizations performed by the processor includes fan-out optimization, critical cell optimization, forced net replication, replacement optimization, digital signal processor (DSP) register optimization, block random access memory (BRAM) register optimization, shift register optimization, rewire/look-up table optimization, retiming optimization, critical pin optimization, hold-time fixing optimization, or combinations thereof.

19. The system of claim 13, wherein the optimization history file specifies the set of optimizations in a tool command language script.

20. The system of claim 13, further comprising:
the target IC; and
wherein the instructions further cause the processor to generate a set of configuration data configured to program programmable resources of the target IC to implement the placed and routed circuit design.

* * * * *